United States Patent [19]

Orr et al.

[11] Patent Number: 5,727,157
[45] Date of Patent: Mar. 10, 1998

[54] APPARATUS AND METHOD FOR DETERMINING A COMPUTER NETWORK TOPOLOGY

[75] Inventors: Timothy L. Orr, Gonic; Eric W. Gray, Manchester, both of N.H.

[73] Assignee: Cabletron Systems, Inc., Rochester, N.H.

[21] Appl. No.: 770,696

[22] Filed: Dec. 19, 1996

Related U.S. Application Data

[63] Continuation of Ser. No. 115,232, Sep. 1, 1993, abandoned, which is a continuation-in-part of Ser. No. 583,509, Sep. 17, 1990, abandoned.

[51] Int. Cl.$^6$ ........................................ G06F 11/30
[52] U.S. Cl. ........................ 395/200.54; 395/200.53
[58] Field of Search .................... 395/20.11, 200.16, 395/200.59, 200.53, 200.75, 200.68, 837; 370/94.1, 60, 301

[56] References Cited

U.S. PATENT DOCUMENTS

| | | | |
|---|---|---|---|
| 4,251,858 | 2/1981 | Cambique et al. | 395/200 X |
| 4,545,011 | 10/1985 | Lyon et al. | 364/200 |
| 4,695,946 | 9/1987 | Andreasen et al. | 395/575 |
| 4,701,845 | 10/1987 | Andreasen et al. | 395/575 |
| 4,737,953 | 4/1988 | Koch et al. | 370/94 |
| 4,827,411 | 5/1989 | Arrowood et al. | 364/300 |
| 4,833,592 | 5/1989 | Yamanaka | 364/188 X |
| 4,858,152 | 8/1989 | Estes | 364/550 |
| 4,896,319 | 1/1990 | Lidinsky et al. | 370/60 |
| 4,956,835 | 9/1990 | Grover | 370/16 |

(List continued on next page.)

FOREIGN PATENT DOCUMENTS

| | | |
|---|---|---|
| 0 511 851 A2 | 4/1992 | European Pat. Off. |
| WO 92/05485 | 2/1992 | WIPO . |

OTHER PUBLICATIONS

Steven L. Fulton et al., "An Introduction To Model-Based Reasoning," AI Expert, Jan. 1990, pp. 48–55.

Rodger Knaus, "A Portable Inference Engine," AI Expert, Jan. 1990, pp. 17–20.

R.S. Gilbert et al., "CNMGRAF—Graphic Presentation Serv. for Network Mgt.", Proc. 9th Data Somm. Symp., 10–13 Sep. 1985, pp. 199–206.

D. Bursky, "Simulator Eases Communication Network Design," Electronic Design, vol. 37, No. 21, 12 Oct. 1989, pp. 97–98.

Feldkhun, L. et al., "Event Management As A Common Functional Area of Open Systems Management, Integrated Network Management 1", Meandzya, B. et al. (Eds.) 1989, pp. 365–376.

Scott, K., "Taking Care Of Business With SNMP", Data Communications, Mar. 21, 1990, pp. 31–41.

Presuhn, R., "Considering CMIP", Data Communications, Mar. 21, 1990, pp. 55–60.

(List continued on next page.)

*Primary Examiner*—Mehmet B. Geckil
*Attorney, Agent, or Firm*—Wolf, Greenfield & Sacks, P.C.

[57] ABSTRACT

An apparatus and method for determining the topology of a computer network including data-relay devices and node devices, based on a comparison of source adddresses heard by the various data relay-devices. A source address table is compiled for each port of each data-relay device, and for each select pair of ports the addresses in the source tables are compared to determined whether there is an intersection of heard devices. In order to account for directed transmissions which are not heard at every port, further comparison is made of all of the other ports of the device, eliminating the ports for which the intersection is the empty set. From the determined connections, a topology of the network is graphed showing direct and transitive connections. In cases where there is both a direct and transitive connection, the redundant direct connection is eliminated.

29 Claims, 9 Drawing Sheets

U.S. PATENT DOCUMENTS

| | | | |
|---|---|---|---|
| 4,991,204 | 2/1991 | Yamamoto et al. | 379/221 |
| 5,008,853 | 4/1991 | Bly et al. | 364/900 |
| 5,036,334 | 7/1991 | Henderson et al. | 342/460 |
| 5,038,318 | 8/1991 | Roseman | 395/375 |
| 5,049,873 | 9/1991 | Robins et al. | 340/825.06 |
| 5,133,063 | 7/1992 | Naito et al. | 395/500 |
| 5,138,615 | 8/1992 | Lamport et al. | 320/94.3 |
| 5,138,712 | 8/1992 | Corbin | 395/700 |
| 5,179,554 | 1/1993 | Lomicka et al. | 370/85.13 |
| 5,261,044 | 11/1993 | Dev et al. | 395/159 |
| 5,276,789 | 1/1994 | Besaw et al. | 395/140 |
| 5,295,244 | 3/1994 | Dev et al. | 395/161 |
| 5,297,137 | 3/1994 | Ofek et al. | 370/60 |
| 5,297,138 | 3/1994 | Black | 370/60 |
| 5,321,695 | 6/1994 | Faulk, Jr. | 370/94.1 |
| 5,337,309 | 8/1994 | Faulk, Jr. | 370/60 |
| 5,345,558 | 9/1994 | Opher et al. | 370/94.1 |
| 5,371,744 | 12/1994 | Campbell et al. | 371/8.2 |
| 5,436,909 | 7/1995 | Dev et al. | 395/182.02 |

OTHER PUBLICATIONS

Cantone, R. et al., "Model–Based Probabilistic Reasoning For Electronics Troubleshooting," Proc. 8th International Joint Conference On AI, Aug. 8–Dec. 1983, pp. 207–211.

Hseush, W. et al. "A Network Architecture For Reliable Distributed Computing," Proc. 1987 Symp. On Simulation Of Computer Networks, pp. 11–22.

Jones, E. et al., "Monitoring And Analysis Strategies For Digital Networks," IEEE J. On Selected Areas In Communications, vol. 6, No. 4, May 1988, pp. 715–721.

Sutter, M. et al., "Designing Expert Systems For Real–Time Diagnosis Of Self–Correcting Networks," IEEE Network Magazine, Sep. 1988, pp. 43–51.

"Advanced Network Management For Ethernet And Token Ring," (Product Announcement) SynOptics Communications, Inc., Mar. 4, 1991.

"Computer Dictionary, 2nd Ed", Microsoft Press, 1994 p. 285.

APPARATUS AND METHOD FOR DETERMINING A COMPUTER NETWORK TOPOLOGY

CROSS REFERENCE TO RELATED APPLICATION

This application is a continuation of application Ser. No. 08/115,232, filed Sep. 1, 1993, now abandoned, which is a continuation-in-part of and commonly assigned U.S. Ser. No. 07/583,509 filed Sep. 17, 1990 entitled "NETWORK MANAGEMENT SYSTEM USING MODEL-BASED INTELLIGENCE" by R. Dev et al. now abandoned.

FIELD OF THE INVENTION

This invention relates to a system for determining the topology of a computer network which includes data-relay devices and node devices, the topology being determined based on a comparison of source addresses "heard" by the various data-relay devices.

BACKGROUND OF THE INVENTION

Computer networks are widely used to provide increased computing power, sharing of resources and communication between users. Computer systems and computer system components are interconnected to form a network. Networks may include a number of computer devices within a room, building or site that are interconnected by a high speed local data link such as local area network (LAN), token ring, Ethernet, or the like. Local networks in different locations may be interconnected by techniques such as packet switching, microwave links and satellite links to form a world-wide network. A network may include several hundred or more interconnected devices.

In computer networks, a number of issues arise, including traffic overload on parts of the network, optimum placement of network resources, security, isolation of network faults, and the like. These issues become more complex and difficult as networks become larger and more complex. For example, if a network device is not sending messages, it may be difficult to determine whether the fault is in the network device itself, the data communication link or an intermediate network device between the sending and receiving network devices.

Network management systems have been utilized in the past in attempts to address such issues. Prior art network management systems typically operated by remote access to and monitoring of information from network devices. The network management system collected large volumes of information which required evaluation by a network administrator. Prior art network management systems place a tremendous burden on the network administrator. He/she must be a networking expert in order to understand the implications of a change in a network device parameter. The administrator must also understand the topology of each section of the network in order to understand what may have caused the change. In addition, the administrator must sift through reams of information and false alarms in order to determine the cause of a problem.

An important aspect of any network management system is its ability to accurately represent interactions within the network and between network devices. Toward this end it is crucial that any network management system be provided with some means to determine the topology of the network.

It is a general object of the present invention to provide a method and apparatus for determining the topology of a computer network, which information may be used in managing the network.

It is another object of the present invention to provide an apparatus and method which utilizes lists of source addresses "heard" by each port of a data-relay device (e.g., a bridge) and compares the same to addresses heard by other data-relay devices, in order to determine the topology of the network.

It is a further object of the present invention to provide an apparatus and method for determining connections which are not directly "heard" due to a directed transmission, but which connection can be determined by inference from the addresses heard by other ports of the data-relay device.

It is yet another object of the present invention to provide an apparatus and method which determines both transitive and direct connections between data-relay devices and for which redundant direct connections are eliminated to provide the final network topology.

SUMMARY OF THE INVENTION

According to the present invention, these and other objects and advantages are achieved in a method and apparatus for determining a network topology.

According to the method of the present invention, a list of network addresses "heard" by each port of a data-relay device, such as a bridge, is compiled for each data-relay device in a computer network. The network includes a plurality of data-relay devices and node devices interconnected by a data bus. The node devices (e.g., work stations or disk units) transmit data on the bus via data packets which include a source address. The data-relay devices also transmit their own source address with replies sent to the network management system. Each of the data-relay devices acquires and maintains a source address table which lists the addresses heard by each port of the data-relay device. These lists are then compared to determine whether there is a direct or transitive connection between select ports on different data-relay devices and the resulting connections are used to define a topology showing the interconnections between the devices in the network.

More specifically, if a port $X_i$ (on data-relay device X) hears another data-relay device Y, we know that there is at least a transitive (if not a direct) connection between some port $Y_j$ and $X_i$. If there is a port $Y_j$ that hears X, then we can conclude that $X_i$ is connected to $Y_j$.

Due to directed transmissions, there will not always be a port $Y_j$ that hears X. In this case, another method is used to determine which port of Y is connected to $X_i$. The correct port is found by excluding all ports that cannot be connected to port $X_i$.

More specifically, a node device z that is not in the set of addresses heard by $X_i$ must be in some set $X_q$ where q does not equal i. If port $Y_j$ is connected to port $X_i$, then z must be in set $Y_j$ and in no other set $Y_r$ such that r does not equal j. Thus, to determine which port of Y is connected to port $X_i$ we test each port of Y against the other ports of X, eliminating the ports of Y for which the intersection is the empty set. If enough of the set $X_q$'s and $Y_r$'s are empty, there may be no ports remaining and the technique fails. Otherwise, one is left with one port $Y_r$ which is the port that is connected to $X_i$.

If the above methods are applied to each data-relay port in the network, one can then graph the interconnections between data-relay devices to define the network topology. As a final step, redundant connections are detected by checking each direct connection for the existence of a transitive connection between the same ports. If such a transitive connection exists, then the direct connection is redundant and is eliminated.

The apparatus of the present invention is a system for use with a digital computer network and preferably with a network management system. In a preferred embodiment, the network management system includes a virtual network having models representing network devices, each model containing network data relating to the corresponding network device and means for processing the network data to provide user information. The system includes means for transferring network data from the network devices to the corresponding models, and means for supplying user information from the virtual network to a user. Thus, a model of each data-relay device includes as network data a list of source addresses heard by each port of the data-relay device and the processing means are inference handlers which compare the sets of addresses of the various data-relay devices to determine the topology of the computer network. There are means for updating the network data, e.g., by polling the network entities. The determined network topology is used by the management system for controlling traffic on the network, optimizing network resources, security, isolation of network faults, and the like. In addition, the determined topology may be provided to the user by a video display unit connected to the computer.

These and other advantages of the present invention will be further defined by the following drawings and detailed description.

DETAILED DESCRIPTION

The present invention is an apparatus and method for determining the topology of a computer network consisting of data-relay devices and node devices, which topology may be computed automatically by obtaining and processing information from the network devices.

A data-relay device is a network element that provides electrical and/or logical isolation of local area network segments. A data-relay device forwards network packets from one port of the device to other ports of the device, amplifying and re-timing the electrical signals to (a) increase the maximum cable length, (b) increase the number of permissible nodes on the network, and/or (c) increase the number of network segments. Examples of data-relay devices include bridges, repeaters, hubs and the like. Bridges are defined in IEEE 802.1(d) specification, and repeaters are defined in IEEE 802.1(e) specification. In addition to the above functions, bridges also provide a storage and forward mechanism with packet filtering, to reduce the network load. Hubs are bridges but forward all traffic without filtering. For use in this invention, the hub must be an "intelligent" hub with a source address table for network management as described below.

In accordance with this invention, each data-relay device on the network has a source address table, which is a list of network addresses "heard" by each port of the device. When a network node transmits a packet, the source address of the transmitting device is included in the packet; when the packet is received by the data-relay device, the source address is stored in the source address table, along with the port that the packet was received on.

Entries in the source address table are usually "aged," so that an entry exists in the table for a finite period of time unless refreshed by another packet being received from the same source address on the same port. This maintains the currency of the table, since a device which is physically removed from the network will eventually disappear from the source address table.

If a node device on the network has not yet transmitted a packet, i.e., an inactive node, the data-relay device will not receive a packet from that node for entry on the source address table. However, this can be corrected for by periodically polling all of the node devices on the network to confirm the existence of all devices on the network.

In order to prevent loops in the network, and thus duplication of packets, data-relay devices must not be connected redundantly. Some devices, such as IEEE 802.1(d) compliant bridges, use a spanning tree algorithm to automatically detect and disable redundant devices.

In performing their primary function of packet forwarding, data-relay devices are essentially transparent to the network. They do not transmit packets with their own addresses. However, data-relay devices do transmit responses to network management requests with their own address in the source address field of the packet. This feature is important to the computation of the network topology according to the present invention since, otherwise, the data-relay devices would not appear in each other's source address tables.

Some data-relay devices perform directed transmissions of management packets. Thus, instead of the management response being transmitted on all ports of the device, it is transmitted only on the port where the management request was received. This is usually evident in bridges where the management packet itself is subject to a filtering process. When a data-relay device uses directed transmission of management packets, the address of the device may or may not appear in the source address tables of other data-relay devices, depending on the relative placement of the data-relay devices and the management station. This fact is taken into account in accordance with the present invention when computing the network topology from the source address tables as described below.

Figure 1:
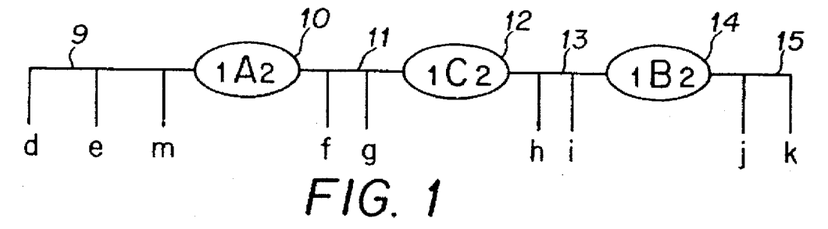
FIG. 1 is a schematic diagram showing an example of a network.
Figure 2:
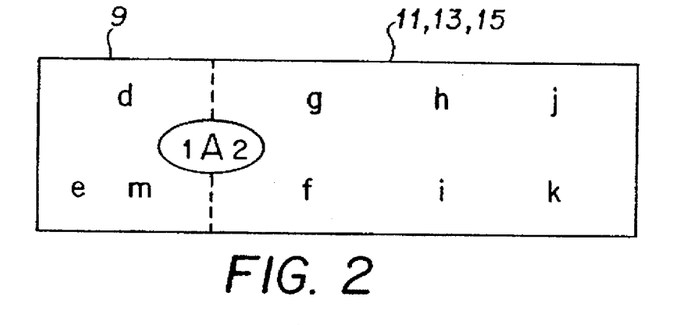
FIG. 2 is a schematic diagram showing the partition imposed by data-relay device A in the network of FIG. 1.
Figure 3:
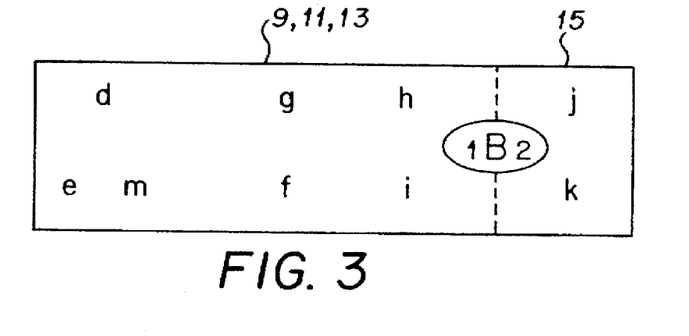
FIG. 3 is a schematic diagram showing the partition imposed by data-relay device B in the network of FIG. 1.
Figure 4:
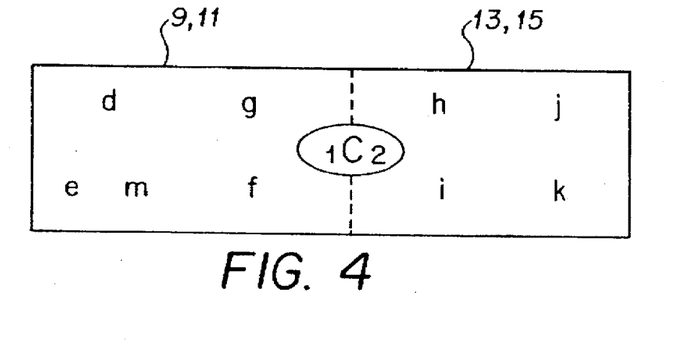
FIG. 4 is a schematic diagram showing the partition imposed by data-relay device C in the network of FIG. 1.
Figure 5:
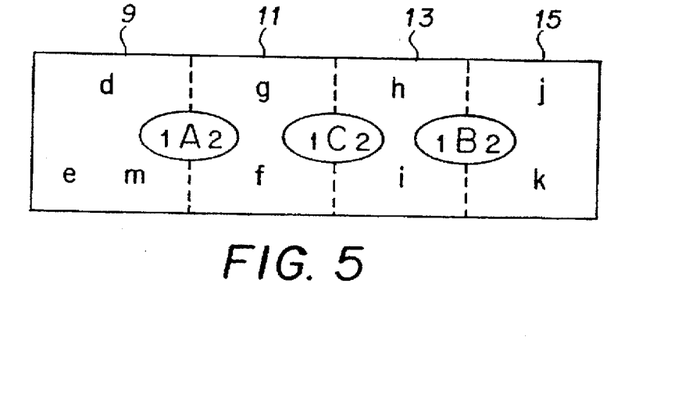
FIG. 5 is a schematic diagram showing the combined partitions of the data-relay devices A, B and C in the network of FIG. 1.

In order to describe the operation of the present invention, a sample network is shown in FIG. 1. The network includes three data-relay devices, 10, 12 and 14, which have been identified as devices A, B and C, each with two numbered ports. The data-relay devices separate the network into three sections or partitions, with end-node devices d-k and management station m at various locations on the network. The partitions generated by devices A, B and C are shown in FIGS. 2, 3 and 4, respectively. The combination of partitions is shown in FIG. 5. In summary:

partition 9 includes node devices d, e and m connected to port 1 of data-relay device A;

partition 11 includes node devices f and g between port 2 of data-relay device A and port 1 of data-relay device C;

partition 13 includes node devices h and i between port 2 of data-relay device C and port 1 of data-relay device B; and partition 15 includes node devices j and k connected to port 2 of data-relay device B.

Figure 8:
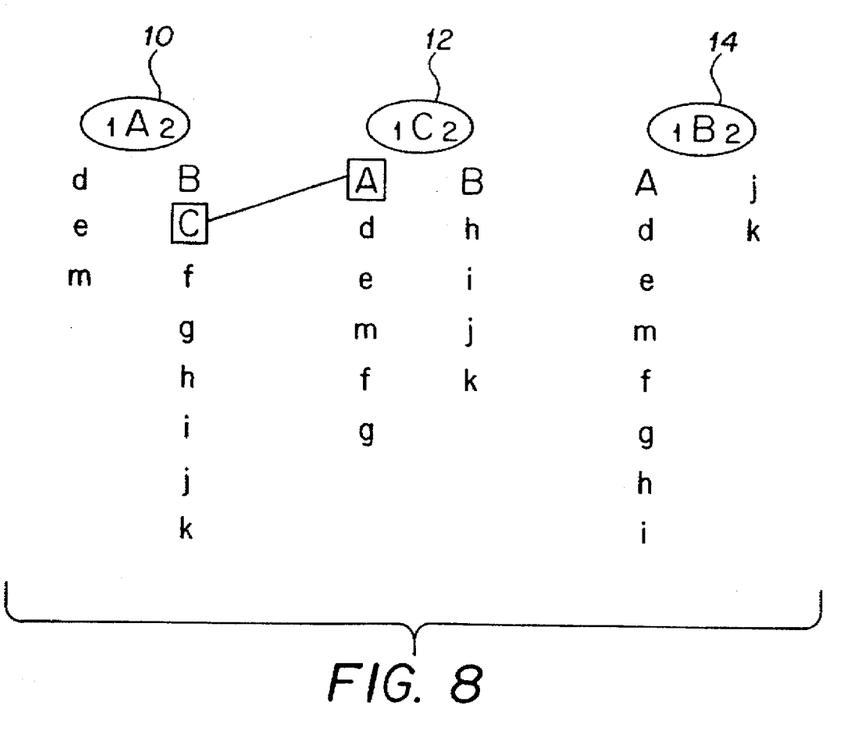
FIG. 8 shows an example of the source address tables for each port of the data-relay devices in the network of FIG. 1.

The source address table for each data-relay device reflects the partitioning. Each port "hears" all the devices contained in its partition. Thus, the sets of devices heard by the various ports are:

A1=(d, e, m)
A2=(B, C, f, g, h, i, j, k)
C1=(A, d, e, m, f, g)
C2=(B, h, i, j, k)
B1=(A, d, e, m, f, g, h, i)
B2=(j, k)

The above address tables for each port are shown schematically in FIG. 8.

The data-relay devices may not be heard by other data-relay devices due to directed transmission of management packets. For example, note that B1 does not hear device C, since in this example C is directing its management traffic toward the management station m. However, since in this example A does not direct its management traffic, B1 does hear A.

A transitive connection is defined as a connection between two nodes that crosses one or more data-relay devices. For example, in FIG. 1 port A2 is transitively connected to port B1 via device C.

In contrast, a direct connection has no data-relay device intervening. Again, referring to FIG. 1, port A2 is directly connected to port C1.

Figure 9:
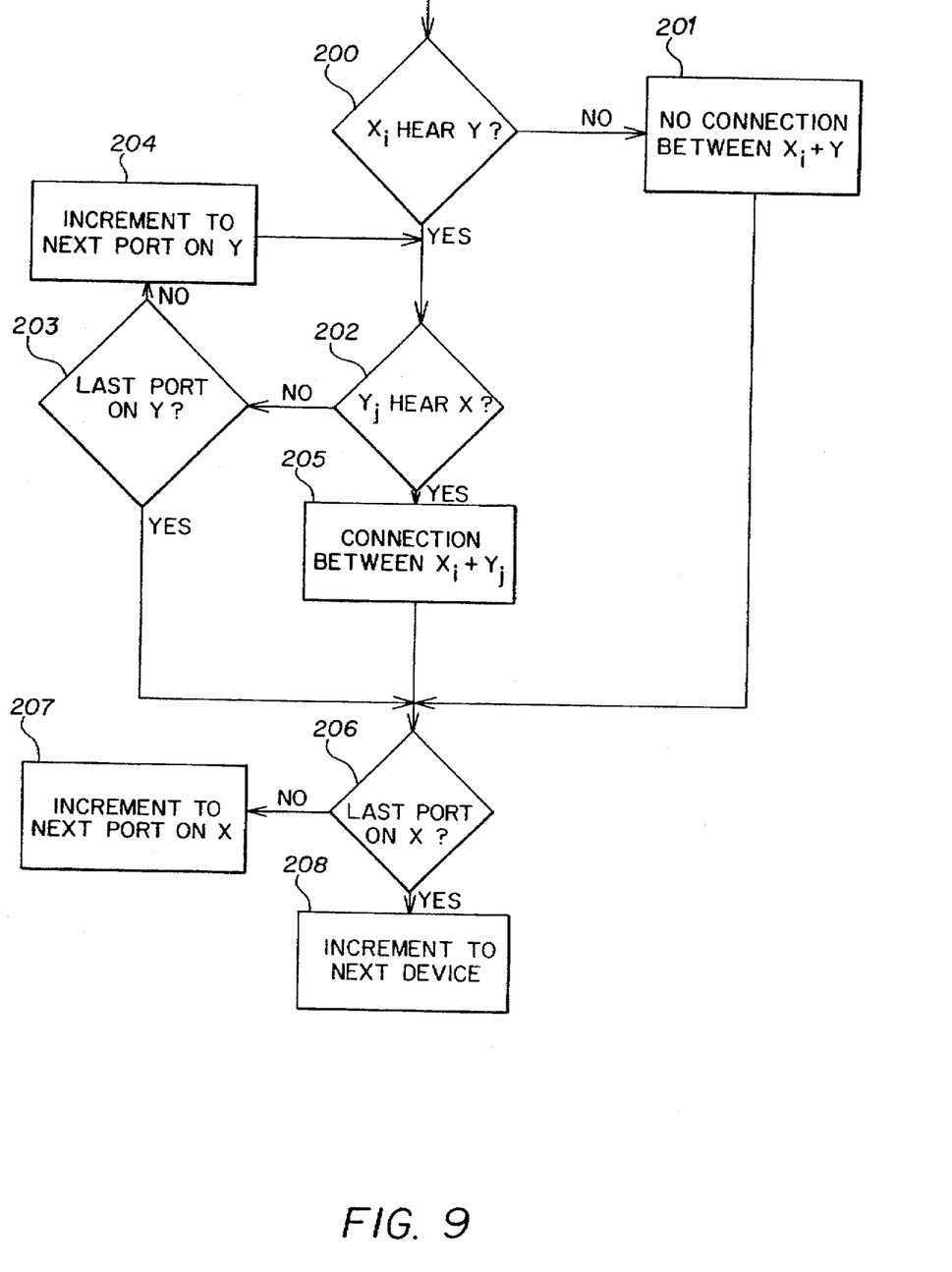
FIG. 9 is a flow chart showing a method of determining a connection between data-relay devices according to the present invention.

A first method of the present invention for determining connections between the data-relay devices is illustrated by the flow chart of FIG. 9, wherein the address tables for a pair of data-relay devices X and Y, such as devices A and C in FIG. 8 are examined. According to the method, if a port $X_i$ hears another data-relay device Y (step 200), we know that there is at least a transitive (if not direct) connection between some port $Y_j$ and $X_i$. If there is a port $Y_j$ that hears X (step 202), then we can conclude that $X_i$ is connected to $Y_j$ (step 205). For example, C is an element of A2, and A is an element of C1, so A2 is connected to C1 (see boxes around relevent entries in the address tables of FIG. 8). If $X_i$ does not hear Y then there is no connection between $X_i$ and Y (step 201) and we advance to the next port on X (step 207). We repeat this process for every port on X (step 206), incrementing to the next port on X (step 207), and incrementing to the next data-relay device (step 208) when we reach the last port on X. Similarly, we repeat the process for every port on Y (step 203), incrementing to the next port on Y (step 204).

Due to directed transmissions, there will not always be a port $Y_j$ that hears X. In this case, another method must be used to determine which port of Y is connected to $X_i$. We find the correct port by excluding all ports that cannot be connected to $X_i$. This method is illustrated in the flow chart of FIG. 10.

Figure 10:
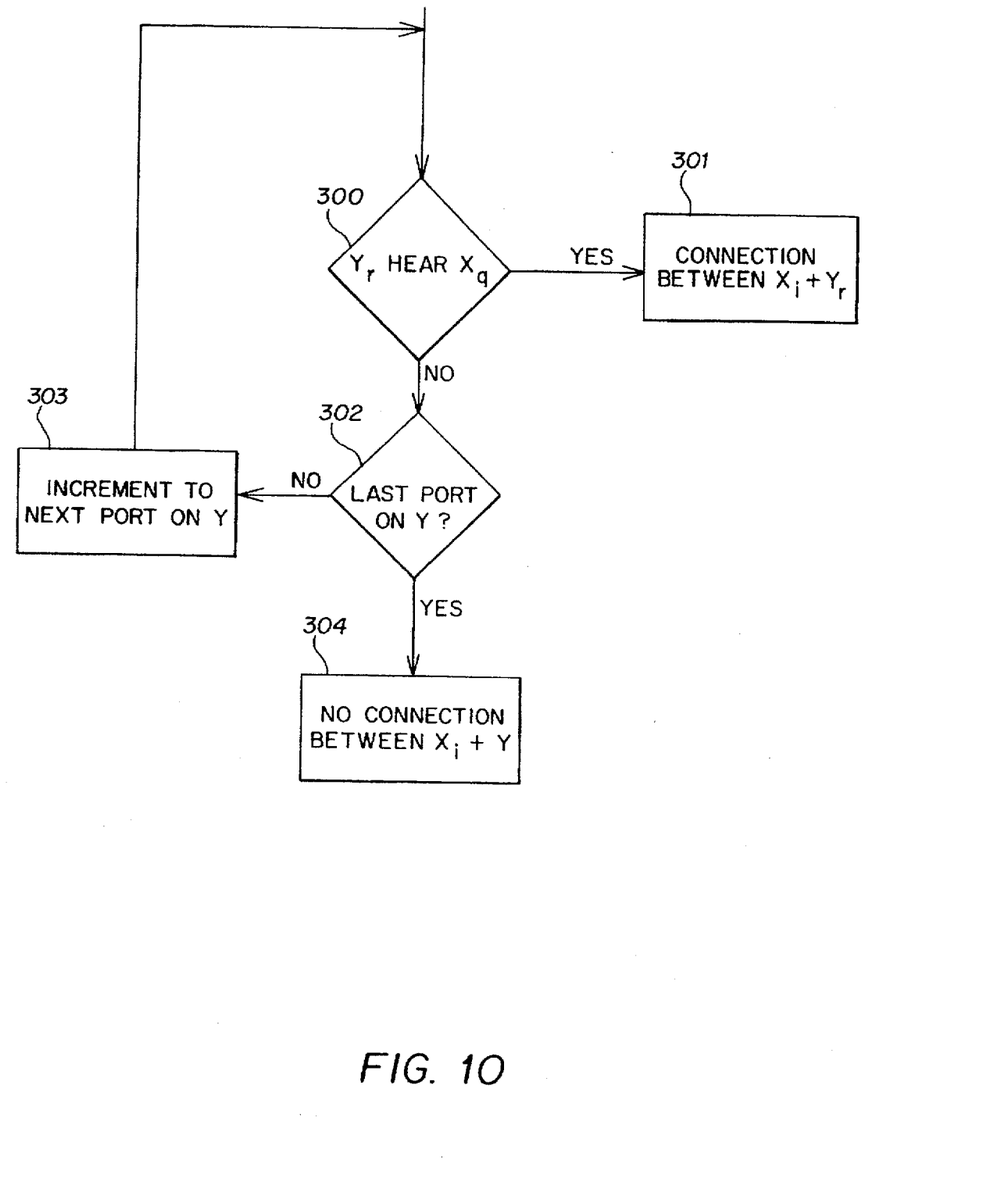
FIG. 10 is a flow chart showing a further method of determining connections between data-relay devices according to the present invention.

Thus a node device z that is not in the set $X_i$ must be in some set $X_q$ such that q does not equal i. If port $Y_j$ is connected to port $X_i$, then z must be in the set $Y_j$, and in no other set $Y_r$ such that r does not equal j. In other words, for all q not equal to i, there is some intersection of the sets $X_q$ and $Y_r$ if port $X_i$ is connected to port $Y_r$. If there is no intersection between $X_q$ and $Y_r$ (i.e., the null set), then port $X_i$ is not connected to port $Y_r$.

To determine which port of Y is connected to $X_i$, we test each port of Y against the other ports of X, eliminating the ports of Y for which the intersection is the empty set. Thus, in step 300 of FIG. 10, we consider whether $Y_r$ hears $X_q$. If the answer is, "yes" then there is a connection between $X_i$ and $Y_r$ (step 301); if the answer is, "no" we check whether this is the last port on Y (step 302) and, if not, we increment to the next port on Y (step 303). After checking all of the ports of Y, if the intersection is the null set, then no connection can be determined between $X_i$ and any port on Y (the method fails) (step 304).

Figure 6:
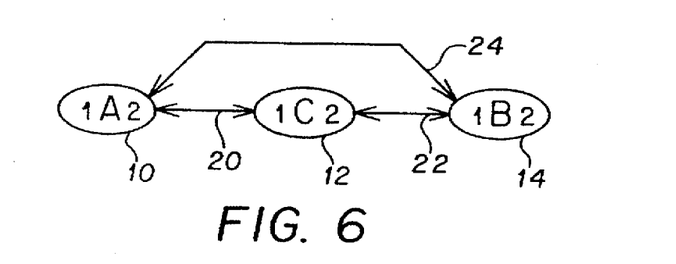
FIG. 6 is a schematic diagram showing trial connections between the data-relay devices of the network of FIG. 1, determined according to the present invention.

If we apply the above methods of FIGS. 9 and 10 to each data-relay port in the network, one can graph the interconnections between the data-relay devices according to the trial connections shown in FIG. 6. Thus, the following direct connections are shown in FIG. 6:

connection 20 between port A2 and port C1;
connection 22 between port C2 and port B1; and
connection 24 between port A2 and port B1.

The connections, or edges between the two ports include both transitive connections as well as direct connections. If a transitive connection exists, then the direct connection is redundant and should be eliminated. For example, as shown in FIG. 7A, because there is a transitive connection between A2 and B1, the direct connection between A2 and B1 has been eliminated.

Figure 11A:
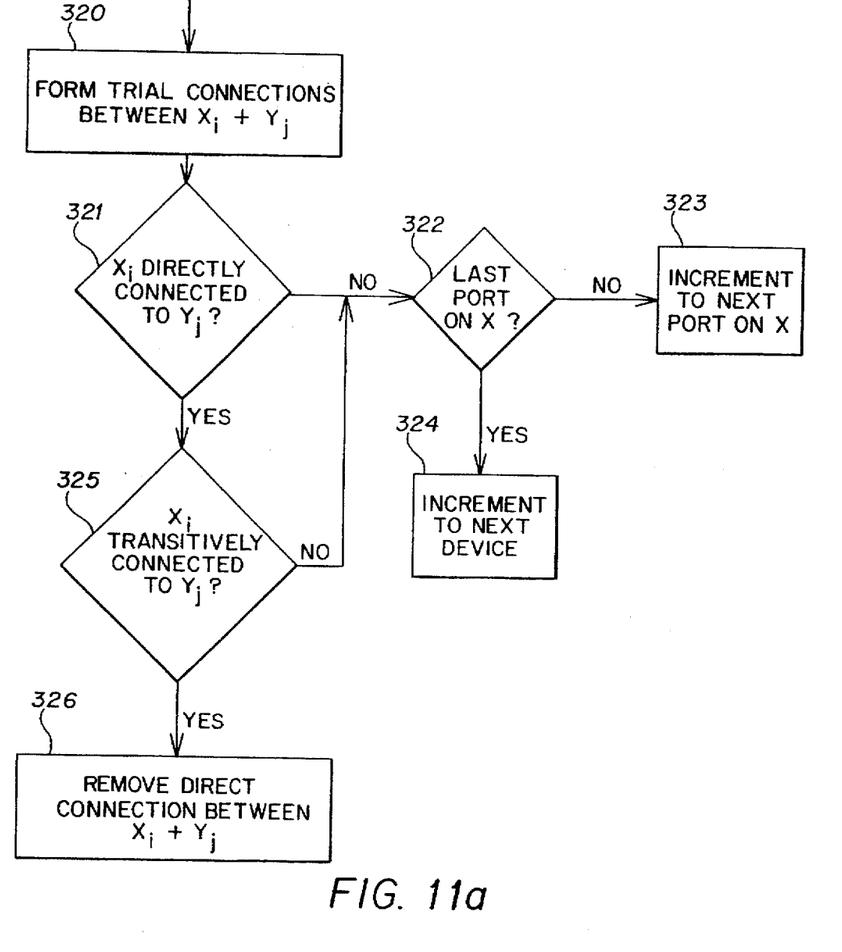
FIG. 11a is a flow chart showing a method of making the trial connections and final connections (see FIGS. 6–7) according to the present invention to determine the topology of the network of FIG. 1.

The method for eliminating redundant connections is illustrated in the flow chart of FIG. 11a. According to step 320, we first form trial connections between $X_i$ and $Y_j$, as shown in FIG. 6. Next, we check whether $X_i$ is directly connected to $Y_j$ (step 321). If there is no direct connection, we check whether this is the last port on X (step 322) and either increment to the next port on X (step 323) or, if this is the last port on X, we increment to the next device (step 324). If we find that $X_i$ is directly connected to $Y_j$, we then check whether $X_i$ is transitively connected to $Y_j$ (step 325). If the answer is, "yes" we remove the direct connection between $X_i$ and $Y_j$ (step 326). In traversing from node to node to reach the desired port, the system can set a "flag" at each node visited since revisiting a node serves no purpose.

Figure 7A:
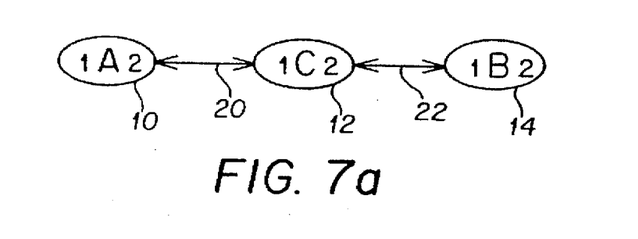
FIG. 7a is a schematic diagram showing the final connections between the data-relay devices in the network of FIG. 1, determined according to the present invention.
Figure 11B:
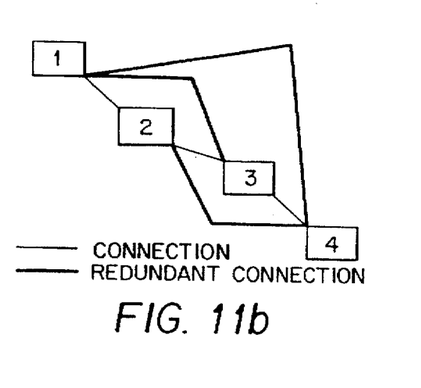
FIGS. 11b and 11c are schematic diagrams showing the elimination of redundant connections in two sample networks.
Figure 11C:
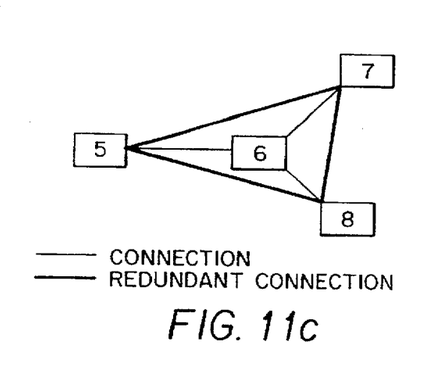

The process of eliminating direct connections where transitive connections exist is illustrated in the simplest possible case in FIGS. 6–7a—i.e., three data-relay devices. It should be pointed out that the same technique is applicable to an arbitrarily complex network of bridges, hubs and end-point devices (within the limitations imposed on bridges and hubs, i.e., no loops may exist). This is true because alternate paths involving more than three data-relay devices may consist of a combination of direct and transitive connections and may include branching as well. In FIG. 11b, transitive connections (1 to 2 and 2 to 3) eliminate direct connection (1 to 4). Similarly, direction connection (2 to 4) is eliminated as well. In FIG. 11c, a three port data-relay device allows for branching in the network; however, the elimination of redundant direct connections (5 to 7, 7 to 8 and 5 to 8 as shown) proceeds exactly as described for three data-relay devices. In real networks, data-relay devices having more than two ports, and network segments consisting of more than three devices are more the rule than the exception.

Figure 7B:
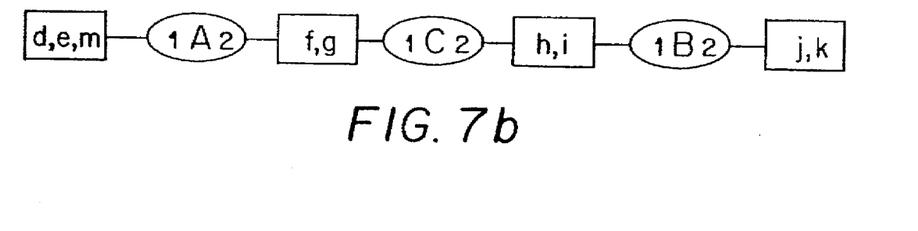
FIG. 7b is the same as FIG. 7a but further includes the node devices between the data-relay devices.

The topology of FIG. 7 can be further defined to include the node devices in each network segment. Each node device belongs to a segment if its address appears in the intersection of the port sets $X_i$ of each data-relay port which is directly connected to the segment. For example, as shown in FIG. 8, node devices h and i appear in the address tables for each ports C2 and B1 and, therefore, nodes h and i should be included as part of the connection 22 between devices A and C. FIG. 7b shows a topology further including the node devices.

In the preferred embodiment described herein, the method and apparatus for determining network topology form a part of a network management system, or provide network topology information to a network management system, such as that described in co-pending and commonly assigned U.S. application Ser. No. 07/583,509, filed Sep. 17, 1990, entitled, NETWORK MANAGEMENT SYSTEM USING MODEL BASED INTELLIGENCE, by R. Dev et al., which issued as U.S. Pat. No. 5,504,921 on Apr. 2, 1996. A corresponding application application was also filed as PCT/US91/06725 on Sep. 17, 1991 and published as Int'l Publ. No. WO92/05485 on Apr. 2, 1992; that application is hereby incorporated by reference in its entirety. However, the present invention may also be used in combination with other network management systems, or in any application where it is desired to obtain the network topology.

Figure 12:
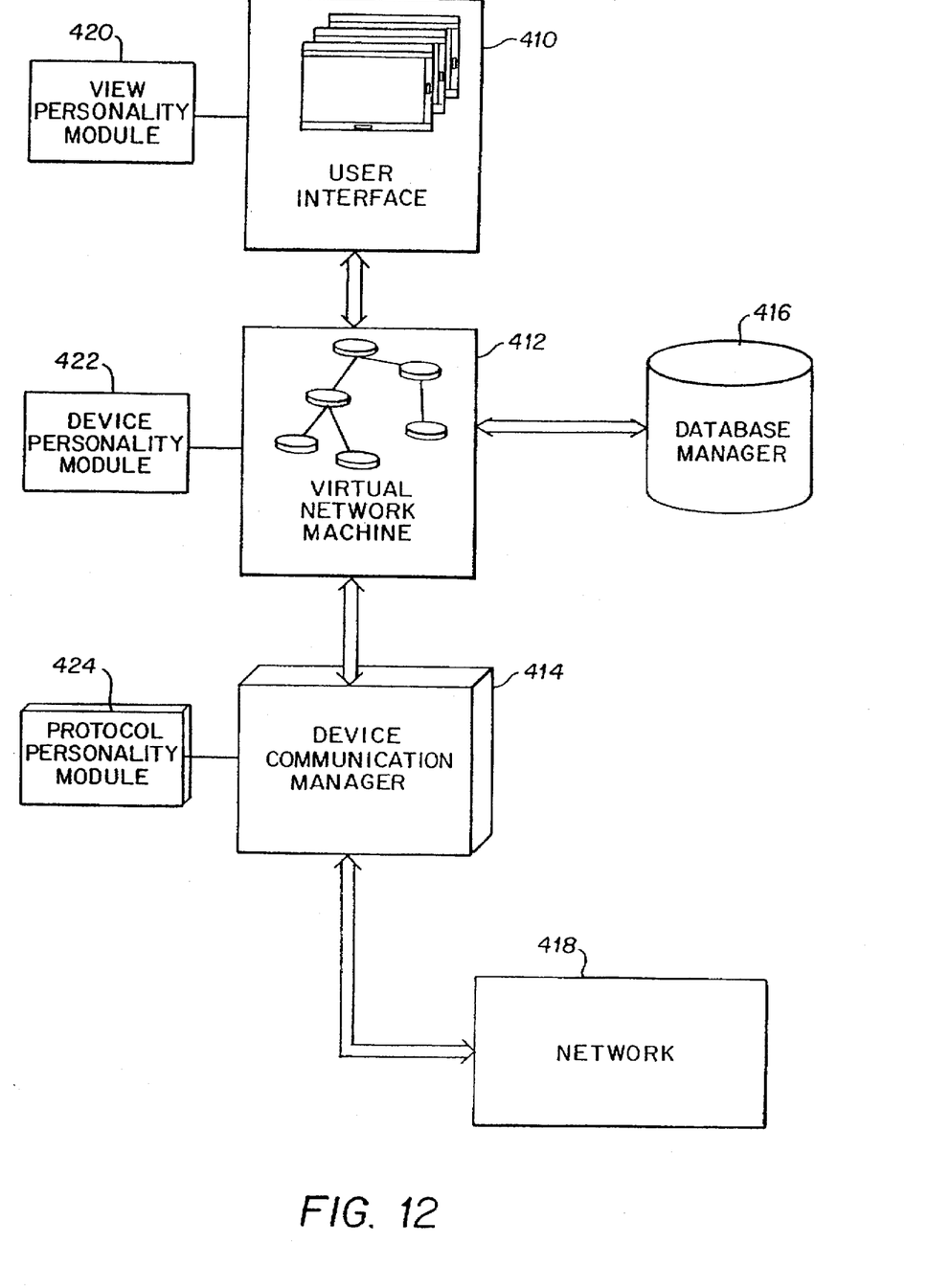
FIG. 12 is a block diagram of a network management system which may utilize the present invention.

In accordance with the network management system of the previously identified application, which is incorporated by reference, FIG. 12 shows a block diagram of the system.

The major components of the network management system are a user interface 410, a virtual network machine 412, and a device communication manager 414. The user interface 410, which may include a video display screen, keyboard, mouse and printer, provides all interaction with the user. The user interface controls the screen, keyboard, mouse and printer and provides the user with different views of the network that is being managed. The user interface receives network information from the virtual network machine 412. The virtual network machine 412 contains a software representation of the network being managed, including models that represent the devices and other entities associated with the network, and relations between the models. The virtual network machine 412 is associated with a database manager 416 which manages the storage and retrieval of disk-based data. Such data includes configuration data, an event log, statistics, history and current state information. The device communication manager 414 is connected to a network 418 and handles communication between the virtual network machine 412 and network devices. The data received from the network devices is provided by the device communication manager to the virtual network machine 412. The device communication manager 414 converts generic requests from the virtual network machine 412 to the required network management protocol for communicating with each network device. Existing network management protocols include Simple Network Management Protocol (SNMP), Internet Control Message Protocol (ICMP) and many proprietary network management protocols. Certain types of network devices are designed to communicate with a network management system using one of these protocols.

A view personality module 420 connected to the user interface 410 contains a collection of data modules which permit the user interface to provide different views of the network. A device personality module 422 connected to the virtual network machine 412 contains a collection of data modules which permit devices and other network entities to be configured and managed with the network management system. A protocol personality module 424 connected to the device communication manager contains a collection of data modules which permit communication with all devices that communicate using the network management protocols specified by the module 424. The personality modules 420, 422 and 424 provide a system that is highly flexible and user configurable. By altering the personality module 420, the user can specify customized views or displays. By changing the device personality module 422, the user can add new types of network devices to the system. Similarly, by changing the protocol personality module 424, the network management system can operate with new or different network management protocols. The personality modules permit the system to be reconfigured and customized without changing the basic control code of the system.

The hardware for supporting the system of FIG. 12 is typically a workstation such as a Sun Model 3 or 4, or a 386 PC compatible computer running Unix. A minimum of 8 megabytes of memory is required with a display device which supports a minimum of 640×680 pixels×256 color resolution. The basic software includes a Unix release that supports sockets, X-windows and Open Software Foundation Motif 1.0. The network management system is implemented using the C++ programming language, but could be implemented in other object-oriented languages such as Eiffel, Smalltalk, ADA, or the like. The virtual network machine 412 and the device communication manager 414 may be run on a separate computer from the user interface 410 for increased operating speed.

Figure 13:
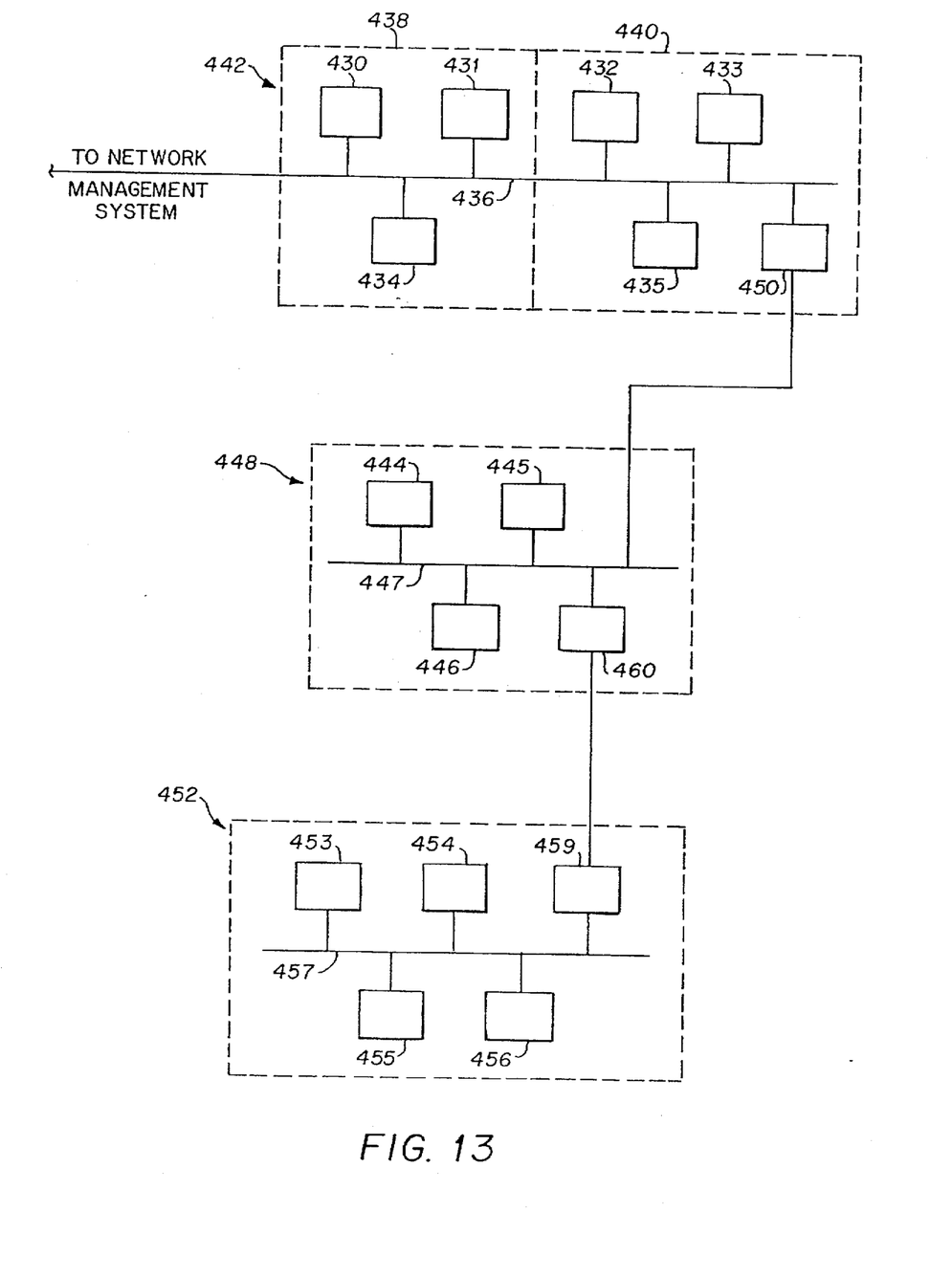
FIG. 13 is a block diagram showing an example of a network connected to the network management system of FIG. 12.

An example of a network connected to this management system is shown in FIG. 13. The network includes workstations 430, 431, 432, 433 and disk units 434 and 435 interconnected by a data bus 436. Workstations 430 and 431 and disk unit 434 are located in a room 438, and workstations 432 and 433 and disk unit 435 are located in a room 440. The rooms 438 and 440 are located within a building 442. Network devices 444, 445 and 446 are interconnected by a data bus 447 and are located in a building 448 at the same site as building 442. The network portions in buildings 442 and 448 are interconnected by a bridge 450. A building 452 remotely located (in a different city, state or country)

from buildings 442 and 448, contains network devices 453, 454, 455 and 456 interconnected by a data bus 457. The network devices in building 452 are interconnected to the network in building 448 by interface devices 459 and 460, which may communicate by a packet switching system, a microwave link or a satellite link. The network management system shown in FIG. 12 and described above is connected to the network of FIG. 13 at any convenient point, such as data bus 436.

In general, the network management system shown in FIG. 12 performs two major operations during normal operation. It services user requests entered by the user at user interface 410 and provides network information such as alarms and events to user interface 410. In addition, the virtual network machine 412 polls the network to obtain information for updating the network models as described hereinafter. In some cases, the network devices send status information to the network management system automatically without polling. In either case, the information received from the network is processed so that the topology, operational status, faults and other information pertaining to the network are presented to the user in a systematized and organized manner.

Each model includes a number a attributes and one or more inference handlers. The attributes are data which define the characteristics and status of the network entity being modeled. Basic attributes include a model name, a model type name, a model type handle, a polling interval, a next-time-to-poll, a retry count, a contact status, an activation status, a time-of-last-poll and statistics pertaining to the network entity which is being modeled. Polling of network devices will be described hereinafter. In addition, attributes that are unique to a particular type of network device can be defined. For example, a network bridge will contain an address source table that defines the devices that are heard on each port of the bridge. A model of the network bridge can contain, as one of its attributes, a copy of the table.

The models used in the virtual network machine also include one or more inference handlers. An inference handler is a C++ object which performs a specified computation, decision, action or inference. The inference handlers collectively constitute the intelligence of the model. An individual inference handler is defined by the type of processing performed, the source or sources of the stimulus and the destination of the result. The result is an output of an inference handler and may include attribute changes, creation or destruction of models, alarms or any other valid output. The operation of the inference handler is initiated by a trigger, which is an event occurring in the virtual network machine. Triggers include attribute changes in the same model, attribute changes in another model, relation changes, events, model creation or destruction, and the like. Thus, each model includes inference handlers which perform specified functions upon the occurrence of predetermined events which trigger the inference handlers. The inference handlers may process the source address lists according to the methods of this invention (FIGS. 9–11).

Figure 14:
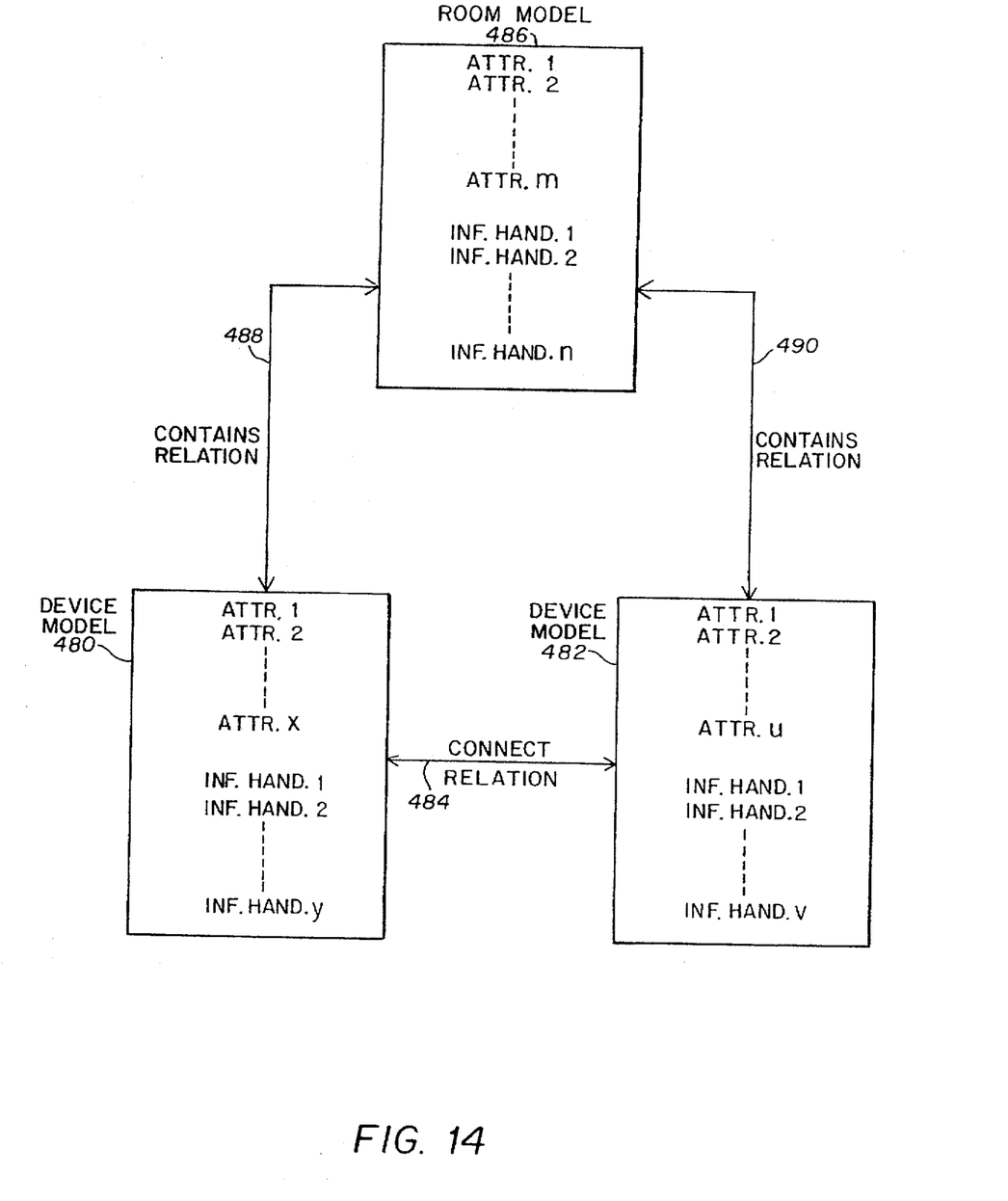
FIG. 14 is a schematic diagram showing the structure of models and the relations between models in the network management system of FIG. 13 which utilizes the present invention.

A schematic diagram of a simple model configuration is shown in FIG. 14 to illustrate the concepts of this management system. A device model 480 includes attributes 1 to x and inference handlers 1 to y. A device model 482 includes attributes 1 to u and inference handlers 1 to v. A connect relation 484 indicates that models 480 and 482 are connected in the physical network. A room model 486 includes attributes 1 to m and inference handlers 1 to n. A relation 488 indicates that model 480 is contained within room model 486, and a relation 490 indicates that model 482 is contained within room model 486. Each of the models and the model relations shown in FIG. 14 is implemented as a C++ object. It will be understood that a representation of an actual network would be much more complex than the configuration shown in FIG. 14.

As discussed above, the collection of models and model relations in the virtual network machine form a representation of the physical network being managed. The models represent not only the configuration of the network, but also represent its status on a dynamic basis. The status of the network and other information and data relating to the network is obtained by the models in a number of different ways. A primary technique for obtaining information from the network involves polling. At specified intervals, a model in the virtual network machine 412 requests the device communication manager 414 to poll the network device which corresponds to the model. The device communication manager 414 converts the request to the necessary protocol for communicating with the network device. The network device returns the requested information to the device communication manager 414, which extracts the device information and forwards it to the virtual network machine 412 for updating one or more attributes in the model of the network device. The polling interval is specified individually for each model and corresponding network device, depending on the importance of the attribute, the frequency with which it is likely to change, and the like. The polling interval, in general, is a compromise between a desire that the models accurately reflect the present status of the network device and a desire to minimize network management traffic which could adversely impact normal network operation.

According to another technique for updating the information contained in the models, the network devices automatically transmit information to the network management system upon the occurrence of significant events without polling. This requires that the network devices be preprogrammed for such operation.

It will be understood that communication between a model and its corresponding network entity is possible only for certain types of devices such as bridges, card racks, hubs, etc. In other cases, the network entity being modeled is not capable of communicating its status to the network management system. For example, models of buildings or rooms containing network devices and models of cables cannot communicate with the corresponding network entities. In this case, the status of the network entity is inferred by the model from information contained in models of other network devices. Since successful polling of a network device connected to a cable may indicate that the cable is functioning properly, the status of the cable can be inferred from information contained in a model of the attached network device. Similarly, the operational status of a room can be inferred from the operational status contained in models of the network devices located within the room. In order for a model to make such inferences, it is necessary for the model to obtain information from related models. In a function called a model watch, an attribute in one model is monitored or watched by one or more other models. A change in the watched attribute may trigger inference handlers in the watching models.

There are several methods to acquire a list of the data-relay devices in the network. One method is to make a manual data entry. Another is to conduct a "ping sweep" in which requests are sent blindly to a range of addresses, and the active devices respond with a reply. Another is to read system tables, such as the network name servers. Mother is to read the address translation tables; and still another is to read the tables from known network devices. The above techniques are most useful for determining the presence of some network node at a given address; identification of the node as a data-relay device is then accomplished via the management protocol. In many cases, it will be necessary to translate the "management layer address" to a network address; the source address tables will typically utilize management level addresses, whereas the management protocol usually operates via network layer addresses.

While there have been shown and described select embodiments of the present invention, it will be obvious to those skilled in the art that various changes and modifications may be made therein without departing from the scope of the invention as defined by the appended claims.

What is claimed is:

1. A method of determining a topology of a computer network including node devices and data-relay devices coupled to one another by a multi-drop line, each data-relay device having at least one port, the method including the steps of:

acquiring a list of the data-relay devices in the computer network, acquiring a source address table for each at least one port of each data-relay device in the list, the source address table being a compilation of source addresses of packets received from respective node devices and source addresses of management response packets received from other respective data-relay devices on the respective at least one port of the respective data-relay device, selecting a unique ordered pair of different data-relay devices X and Y;

(a) selecting a pair of ports $X_i$ and $Y_j$ on the selected different data-relay devices X and Y, respectively, where i represents a specific port of device X and j represents a specific port of device Y;

(b) determining whether the source address table of port $X_i$ includes an entry for device Y and whether the source address table of port $Y_j$ includes an entry for device X, and when the answer to both is affirmative, establishing a connection between ports $X_i$ and $Y_j$ in the topology; and (c) repeating the above selecting and determining steps (a) and (b) for each different pair of ports of the data-relay devices X and Y;

(d) for each pair of ports $X_i$ and $Y_j$ wherein the source address table of port $Y_j$ does not include an entry for device X, determining whether there is some intersection of the entries of the source address tables for port $Y_r$ and port $X_q$ where r is not equal to j, and q is not equal to i, and when the answer is affirmative, establishing a connection between port $X_i$ and port $Y_r$ in the topology; and (e) repeating the second determining step (d) for each pair of ports $X_i$ and $Y_j$ for which the source address table of port $Y_r$ does not include an entry for device X;

(f) repeating the above selecting and determining steps (a)–(e) for each unique ordered pair of different data-relay devices X and Y in the network; and (g) generating a display of the established connections between the data-relay devices to show the network topology.

2. The method of claim 1, further including:

removing direct connections between $X_i$ and $Y_j$ from the network topology display when there is a transitive connection between $X_i$ and $Y_j$.

3. The method of any one of claims 1 and 2, wherein the data-relay devices send directed transmissions.

4. The method of any one of claims 1 and 2, wherein the network includes a network management system which communicates with the data-relay devices.

5. The method of claim 4, wherein the network management system has a virtual network of models representing node devices and data-relay devices, and wherein the models have means for comparing the source address tables to determine whether there is some intersection.

6. The method of claim 4, wherein the data-relay devices transmit directed responses to management requests only on the port where a management request was received.

7. The method of any one of claims 1 and 2, wherein the network topology is provided to a user by a display unit connected to the network.

8. The method of any one of claims 1 and 2, wherein the display includes connections between the data-relay devices and the node devices.

9. The method of claim 3, wherein the network topology is used by the network management system for one or more of controlling traffic on the network, optimizing network resources, security, and isolation of network faults.

10. The method of claim 1, wherein the data-relay devices include bridges, repeaters, and hubs.

11. The method of claim 1, wherein the node devices transmit packets which include the source address of the transmitting node device.

12. The method of claim 1, wherein the data-relay devices are logically connected in a spanning tree.

13. The method of claim 1, wherein the data-relay devices include three-port data-relay devices which provide branch connections.

14. A system for determining a topology of a computer network having node devices mad data-relay devices coupled to one another by a multi-drop line, means for storing a source address table for an associated port of each data-relay device, the source address table being a compilation of source addresses of packets received from respective node devices and source addresses of management response packets received from other respective data-relay devices on the associated port, the system including:

means for processing the addresses in the source address tables of different pairs of ports of different data-relay devices to determine whether there is a connection between the respective ports, the processing means comprising:

means for selecting a unique ordered pair of different data-relay devices X and Y;

(a) means for selecting a pair of ports $X_i$ and $Y_j$ on the selected different data-relay devices X and Y, respectively, where i represents a specific port of device X and j represents a specific port of device Y;

(b) means for determining whether the source address table of port $X_i$ includes an entry for device Y and whether the source address table of port $Y_j$ includes an entry for device X, and when the answer to both is affirmative, establishing a connection between ports $X_i$ and $Y_j$ in the topology;

(c) means for repeating operation of the above selecting and determining means (a) and (b) for each different pair of ports of the data-relay devices X and Y;

(d) for each pair of ports $X_i$ and $Y_j$ wherein the source address table of port $Y_j$ does not include an entry for device X, means for determining whether for all q not equal to i, there is some intersection of the entries of the source address tables for port $X_q$ and port $Y_r$, for all r not equal to j, and when the answer is affirmative, establishing a connection between port $X_i$ and port $Y_r$ in the topology;

(e) means for repeating operation of the second determining means (d) for each pair of ports $X_i$ and $Y_j$ for which the source address table of port $Y_j$ does not include an entry for device X;

(f) means for repeating operation of the above selecting and determining means (a)–(e) for each unique ordered pair of different data-relay devices X and Y in the network; and (g) means for generating a display of the established connections between the data-relay devices to show the network topology.

15. The system of claim 14, further including means for removing direct connections between $X_i$ and $Y_j$ from the network topology display when there is a transitive connection between $X_i$ and $Y_j$.

16. The system of any one of claims 14 and 15, wherein the data-relay devices have means for sending directed transmissions.

17. The system of any one of claims 14 and 15, wherein the network includes a network management system which communicates with the data-relay devices.

18. The system of any one of claims 14 and 15, further including a display unit connected to the network wherein the network topology is provided to a user.

19. The system of any one of claims 14 and 15, wherein the display includes connections between the data-relay devices and the node devices.

20. The system of claim 17, wherein the network management system has a virtual network of models representing node devices and data-relay devices, and wherein the models have means for comparing the source address tables to determine whether there is some intersection.

21. The system of claim 17, wherein the network topology is used by the network management system for one or more of controlling traffic on the network, optimizing network resources, security, and isolation of network faults.

22. The system of claim 17, wherein the data-relay devices transmit directed responses to management requests only on the port where a management request was received.

23. The system of claim 14, wherein the data-relay devices include bridges, repeaters, and hubs.

24. The system of claim 14, wherein the node devices transmit packets which include the source address of the transmitting node device.

25. The system of claim 14, wherein the data-relay devices are logically connected in a spanning tree.

26. The system of claim 14, wherein the data-relay devices include three-port data-relay devices which provide branch connections.

27. A method of determining a topology of a computer network including node devices and data-relay devices coupled to one another by a multi-drop line, each data-relay device having at least one port, each at least one port having associated with it a source address table including source addresses of packets received from respective node devices and source addresses of management response packets received from other respective data-relay devices on the respective port, the method comprising steps of:

acquiring a list of data-relay devices;

selecting a unique ordered pair of data-relay devices X, Y from the list;

for the selected pair of data-relay devices:
(a) for each at least one port $X_i$ on device X:
(b) determining whether the source address table for port $X_i$ includes an entry for device Y; and
(c) when the source address table for port $X_i$ includes an entry for device Y, for each port $Y_j$ on device Y:
(d) determining whether the source address table for port $Y_j$ includes an entry for device X, establishing a connection between ports $X_i$ and $Y_j$; and
(e) when the source address table for port $Y_j$ includes an entry for device X, establishing a connection between ports $X_i$ and $Y_j$; and
(f) when no port $Y_j$ on device Y has a source address table with an entry for device X, determining whether any source address table of any port $Y_r$ other than port $Y_j$ intersects with any source address table of any port of device X other than port $X_i$ and when there is an intersection found, establishing a connection between port $X_i$ and port $Y_r$; and repeating steps (a)–(f) for each unique ordered pair of data-relay devices X, Y; and
(g) generating a display of the established connections between the data-relay devices to show the network topology.

28. A method of determining a topology of a computer network including node devices and data-relay devices coupled to one another by a multi-drop line, each data-relay device having at least one port, each at least one port having associated with it a source address table including source addresses of packets received from respective node devices and source addresses of management response packets received from other respective data-relay devices on the respective port, the method comprising the steps of:

selecting a unique ordered pair of first and second data-relay devices;

for the selected pair of first and second data-relay devices:
(a) for each respective port on the first data-relay device:
(b) determining whether the source address table for the respective port on the first data-relay device includes an entry for the second data-relay device; and
(c) when the source address table for the respective port on the first data-relay device includes an entry for the second data-relay device, determining, for each respective port on the second data-relay device, whether the source address table for the respective port on the second data-relay device includes an entry for the first data-relay device and when the source address table for the respective port on the second data-relay device includes an entry for the first data-relay device, establishing a connection between the respective port of the first data-relay device and the respective port of the second data-relay device;
(d) when the respective port on the first data-relay device includes an entry for the second data-relay device and no port on the second data-relay device has a source address table with an entry for the first data-relay device, determining whether any source address table entries of any of the ports on the second data-relay device intersect with any source address table entries of any of the ports on the first data-relay device except for the respective port on the first data-relay device; and when such an intersection is found, establishing a connection between the respective port on the second data-relay device and the port on the first data-relay device which has an entry for the second data-relay device in its source address table; and repeating steps (a)-(d) for each unique ordered pair of first and second data-relay devices; and generating a display of the established connections between the data-relay devices to show the network topology.

29. A method of determining a topology of a computer network including node devices and data-relay devices coupled to one another by a multi-drop line, each data-relay device having at least one port, each at least one port having associated with it a source address table including source addresses of packets received from respective node devices and source addresses of management response packets received from other respective data-relay devices on the respective port, the method comprising the steps of:

selecting a unique ordered pair of first and second data-relay devices;

for the selected pair of first and second data-relay devices:

(a) determining whether the source address table for a respective port of the first data-relay device includes an entry for the second data-relay device;

(b) when the source address table for the respective port of the first data-relay device includes an entry for the second data-relay device:

(c) determining whether the source address table for a respective port of the second data-relay device includes an entry for the first data-relay device and, if so, establishing a connection between the respective port of the second data-relay device and the respective part of the first data-relay device;

(d) repeating step (c) for each port on the second data-relay device;

(e) when no source address table in the second data-relay device has been determined to include an entry for the first data-relay device:

(f) determining whether the source address table for a respective port of the second data-relay device intersects with a source address table for any port on the first data-relay device except for the respective port of the first data-relay device determined in step (a) and, if so, establishing a connection between the respective port of the second data-relay device and the respective port of the first data-relay device which has an entry for the second data-relay device in its source address table as determined in step (a); and (g) repeating step (f) for each port on the second data-relay device;

(h) repeating steps (a)-(g) for each port on the first data-relay device; and repeating steps (a)-(h) for each unique ordered pair of first and second data-relay devices; and generating a display of the established connection between the data-relay devices to show the network topology.

* * * * *

UNITED STATES PATENT AND TRADEMARK OFFICE
CERTIFICATE OF CORRECTION

PATENT NO. : 5,727,157
DATED : March 10, 1998
INVENTOR(S) : Orr et al.

It is certified that error appears in the above-identified patent and that said Letters Patent is hereby corrected as shown below:

Col. 10, line 67. -   delete "Mother" and substitute -- Another --

Signed and Sealed this

Fifteenth Day of June, 1999

Attest:

Q. TODD DICKINSON

*Attesting Officer*   Acting Commissioner of Patents and Trademarks